March 8, 1960   A. I. MOON, JR., ET AL   2,927,458
MULTIPLE STAGE LOAD INDICATOR
Filed Oct. 28, 1955

INVENTORS
ALBERT I. MOON, JR.
& VIRGIL E. GOODMAN
BY
ATTORNEY

2,927,458
MULTIPLE STAGE LOAD INDICATOR

Albert I. Moon, Jr., Santa Monica, and Virgil E. Goodman, West Covina, Calif., assignors to General Dynamics Corporation, San Diego, Calif., a corporation of Delaware Application October 28, 1955, Serial No. 543,494

4 Claims. (Cl. 73—141)

This invention relates generally to testing apparatus and more particularly to extended range testing apparahus for determining and measuring loads or forces by a combination of stress responsive members which cooperate to selectively respond to the load or force to be measured.

Briefly, the load measuring device in accordance with the present invention may take the form of a pair of beam members which are rigid in comparison with a cross-beam that is interposed therebetween. Thus, any primary deformation or bending caused by a load applied to the beam members will take place largely in the cross-beam and by suitable location of the cross-beam with respect to the beam members, the effect of the applied load may be magnified in the cross-beam. The strain in the cross-beam may be conveniently measured by suitable gauges and from a measurement thus taken the applied load may be determined. Restraining means are positioned between the beam members and serve to limit the maximum free deflection thereof; when the restraining means become operative and arrest the free deflection of the beam members, the applied load is then resisted by the restraining means together with the beam members and the cross-beam. Thus, the strain versus load characteristic of the cross-beam is modified in the operative region of the restraining means.

It is conventional practice to measure loads by ascertaining the deformation of a single stress-responsive member or the simultaneous deformation of more than one such member. The utility of such load or stress measuring devices is limited, however, because they are not adapted to functioning over a wide range of loads while, at the same time, affording desired high accuracy in the lower range of loads. Considerable application exists for a load measuring device which can function over a wide and extended range of loads, while retaining high accuracy at low load levels.

For example, such a device is particularly useful in testing the strength of materials, because in this application it becomes possible, when applying successively higher loads, intermittently to revert accurately to a tare or reference load of a much lower magnitude for the purpose of acertaining any permanent deformation of the specimen being tested. An accurate return to a predetermined tare load in this type of testing is not possible with conventional single-stage indicators because the limits of accuracy of present indicators will not permit it.

It is, therefore, an object of the present invention to provide an instrument which will combine high accuracy at low levels of applied loads with the ability to function effectively over an extremely wide range of applied loads.

Another object of the present invention is to provide a load indicator which measures loads or pressures by measuring the strain in a member which undergoes both bending and axial tension loads.

Another object of the present invention is to provide a load measuring device which has a load versus strain curve having a plurality of substantially linear portions each having a different slope.

Another object of the present invention is to provide a multiple stage load measuring device in which the sensitivity of the device is selectively adjustable at various ranges of applied loads.

Another object of the present invention is to provide a simple, economical, and compact load indicator which can function over an extremely wide range of loads.

Other objects and features of the present invention, as well as many advantages of it, will be readily apparent to those skilled in the art from a consideration of the remainder of this description, the appended claims, and the accompanying drawings in which:

It is to be understood that the accompanying drawings do not represent any precise commercial embodiment of this invention drawn to scale but instead merely indicate the preferred manner of constructing load indicators herein described.

Although the material and method of construction of the load indicator 10 are not essential elements of the present invention, it should be noted that these factors will be partly governed by the maximum load or pressure to be measured. Where loads of the order of 20,000 pounds are being measured, steel has given satisfactory results. At lower load levels, other materials, such as aluminum, have been used effectively.

Figure 1:
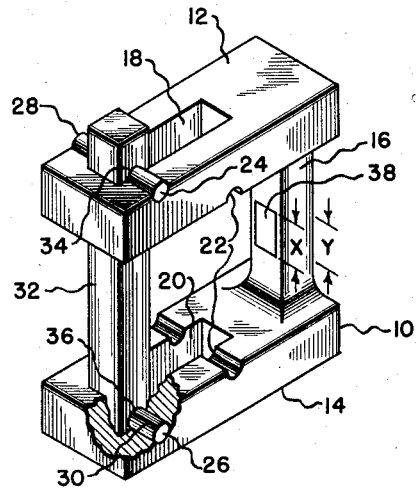
Figure 1 is a perspective view illustrating one embodiment of the present invention.

Referring now to the drawings, Figure 1 shows a load indicator 10 of the present invention having beam members 12 and 14 and a cross-beam 16 integral with the beam members and interposed therebetween. These members together form a generally U- or H-shaped configuration depending upon the relative positions of the cross-beam 16 and beam members 12 and 14. The beam members 12 and 14 are rectangular in cross section and are considerably larger in cross-sectional area than the cross-beam 16 which is also rectangular in cross-section. The beam members are therefore more rigid than the cross-beam 16.

As shown in Figure 1, beam member 12 is provided with a rectangular aperture or slot 18 and beam member 14 has a similar aperture or slot 20 which is aligned with the aperture 18. On each of the confronting inner faces of beam member 12 and 14 there is defined a groove 22 displaced from cross-beam 16, situated on either side of the aperture 18 and at right angles to the length of the apertures. The apertures provide for a interlinking with load indicator 10 of linkage members by means of which a tensile load can be applied to the load indicator 10 through cotters adapted to fit into the grooves 22. The linkage members are not shown in the drawing, inasmuch as they are not essential members of the present invention.

On the upper surface of beam member 12 and toward the outer end of the aperture 18 therein, there is defined a transverse groove 24 on either side of the aperture 18 and at right angles to the length thereof. In the beam member 14 and near the outer end of the aperture 20 defined therein, there is located a transverse bored hole 26 which extends through the beam member 14 on either side of the aperture 20 and is at right angles to the length thereof. The groove 24 and the hole 26 are adapted to accommodate the cotters 28 and 30. The apertures 18 and 20 are adapted to accommodate, in addition to the members which apply loads, the tie member 32 which is adapted to fit through these apertures in the manner shown in Figure 1. Tie member 32 is provided with bored holes 34 and 36, displaced as shown, for accommodating cotters 28 and 30. Cotter 28 is fitted through the holes 34 and seats in the groove 24. The cotter 30 is fitted through the hole in tie member 32 and through the hole 26 in beam member 14.

In the operation of the load indicator 10, a tensile load is applied at the grooves 22. The load is applied normal to the beam members by means of linkage members which fit through the apertures 12 and 14. There are thus applied to the beam members 12 and 14 forces which cause these members to deflect apart. From the geometrical relations of the parts, it is obvious that, as beam members 12 and 14 are deflected, there is applied to the cross-beam 16 a tensile load and a bending moment. Cross-beam 16 is thereby deformed in such a manner that the surface facing towards tie member 32 undergoes tensile strain while the opposite surface undergoes compressive strain. It is obvious that the dimension X on the cross-beam will increase with increasing load and that dimension Y on the opposite surface will decrease. The cross-beam being considerably smaller in cross-sectional area than beam members 12 and 14 will undergo much more deformation than either of these members. Measurements of the deformation at the surface of cross-beam 16 may be translated into load readings in a manner hereinafter discussed.

The holes 34 and 36 in tie member 32, the hole 26 in beam member 14, and the groove 24 in beam member 12 are in such spaced relations that when the applied load is in the low range, the cotter 28 is not seated in groove 24. Cotter 28 fits loosely, so that tie member 32 is not in tension and does not aid in resisting the load. The spaced relations among the holes 34, 36, and the groove 24 are such that at a predetermined applied load, the deflection of the beam members 12 and 14 causes the cotter 28 to seat firmly in groove 24. At this point the tie member 32 is placed in tension and begins resisting the load applied to it through the cotters 28, 30, and the beam members 12 and 14. Additional load applied at the grooves 22 is resisted by the tie member 32 in addition to the beam members and the cross-beam. The additional load must elongate tie member 32 in order to deflect the beam members 12 and 14. The tie member 32 being of the relative dimensions and cross-sectional area shown, it is obvious that a much greater force will be required per unit of deformation at the surface of the cross-beam than is required when tie member 32 is not resisting the load. From the geometrical relations of the parts it is evident that tie member 32 resists the major portion of such additional load, and that deformation of the tie member 32 under load therefore largely governs the overall deformation of the load indicator 10. Conversely, the overall deflection per unit of load is less after the tie member 32 becomes operative in resisting the load. Therefore, other relevant factors remaining the same, loads of a greater order of magnitude may be applied and measured with the tie member 32 resisting the load than would be possible with only the beam members 12 and 14 and cross-beam 16 resisting the load.

This embodiment of the present invention thus provides a two-stage load indicator of considerable utility. It can measure low range loads with high accuracy and it is adapted to functioning over a wide range of loads. As the applied load is progressively increased or decreased, the indicator can pass smoothly from one load-range to another, making the transition whereby the tie member 32 becomes operative or inoperative. It has been found in practice that the cotter and groove arrangement provides a smooth transition. The present invention makes it possible to measure loads in a relatively low range with desired high accuracy and to proceed to the measurement of loads of a higher order without disturbing the indicator or the apparatus in which it is mounted.

The load can intermittently be reduced accurately to a selected low value or increased to a desired high value. The device in effect performs the function of two different indicators without the necessity of dismantling and re-assembling the apparatus in which the indicator is mounted each time a shift is made from one range of loads to another. The utility of this feature will be apparent to those versed in the art.

As previously mentioned, the deformation at the surface of the cross-beam 16 is of a relatively large scale, so accurate readings may be taken by means of a strain gauge or other measuring means attached at this surface. In the embodiment of the invention shown in Figure 1, the deformation or strains represented by changes in dimension X are measured by means of an electrical strain gauge 30, this being a convenient and accurate means of measurement. Various other instruments for measuring the strain may be employed. The accuracy of measurement of the load indicator 10 may be increased by the use of two strain gauges, one mounted on the tension side of the cross-beam 16, as is the gauge 30 in the figure, for measuring changes in dimension X and the other mounted on the compression side to measure changes in dimension Y. The two strain gauges would be electrically connected in series. Even greater accuracy may be obtained through the use of a third strain gauge mounted on the tie member 32 and electrically connected with the other two. The third gauge would provide increased accuracy in the relatively high ranges of loads where the tie member 32 resists the load.

Figure 2:
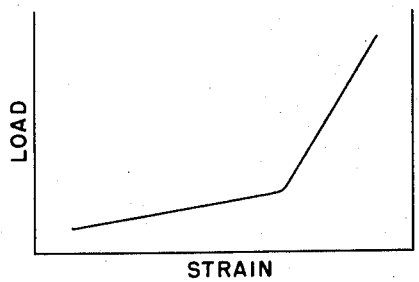
Figure 2 is a graphical representation showing the strain produced in the cross-beam as a function of the load applied to the indicator shown in Figure 1.

Conventional means may be employed for translating the electrical measurements from the strain gauge or gauges into load readings. Examples of such means are a direct reading instrument or a calibration curve. An example of a calibration curve is shown in Figure 2. It is a graphical representation showing the applied load as a function of the strain produced at the surface of cross-beam 16 as measured by the electrical strain gauge 38. The left portion is the curve of load versus deformation before tie member 32 becomes operative in resisting the load. The right portion of the curve shows the relationships between these variables after tie member 32 becomes operative in resisting the load. The junction of the two portions of the curve represents the value of applied load at which the tie member 32 begins resisting the load.

The slope of the left portion of the curve of Figure 2 obviously represents a greater strain per unit load than does the right portion of the curve. This makes for high accuracy of measurement in the lower range of loads. The right portion of the curve illustrates that a much greater load is required per unit of strain and that the load indicator is capable of measuring loads which are of higher order than those indicated by the left portion of the curve. Figure 2 shows a graph with two straight line portions each of which represents a linear relationship between applied load and strain. However, this relationship may or may not be linear depending upon the range of loads and the exact points where strain is measured. In the load indicator shown in Figure 1, the relationship is nearly linear for a limited range of loads, strain being measured with the strain gauge in the position shown. True linearity cannot be had at the surface of the cross-beam 16 because in addition to a tensile load, this member has applied to it a bending moment which tends to make the relationship non-linear.

Figure 3:
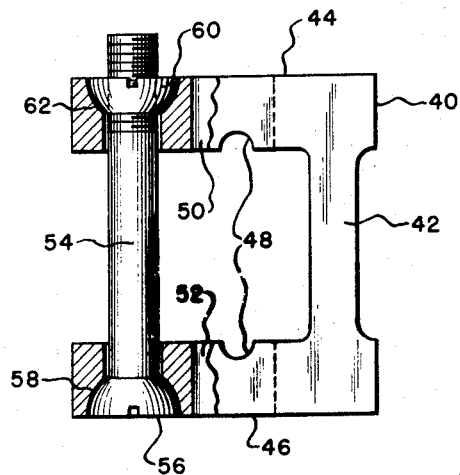
Figure 3 is a side elevation view of a modified load indicator in accordance with the present invention.

In Figure 3 is shown a second embodiment of the present invention. It provides increased utility over the embodiment shown in Figure 1 in that means are provided for selectively varying the predetermined load at which a restraining member begins to resist the applied load. This embodiment has a cross-beam 42 similar to the cross-beam 16 of the embodiment shown in Figure 1. The beam members 44 and 46 serve the same purpose as the beam members 12 and 14 of the embodiment shown in Figure 1. On each of the confronting surfaces of beam members 44 and 46 there is provided a groove 48 similar to the grooves 22 shown in Figure 1 and for the same purpose as grooves 22. Beam member 44 is provided with a rectangular aperture 50 which is in alignment with a corresponding aperture 52 in beam member 46. Like the apertures 18 and 20 shown in Figure 1, they provide for linkage members by means of which a tensile load is applied to the load indicator through cotters adapted to fit into the grooves 48. There is provided a restraining member in the form of a bolt 54. Referring to Figure 3, the surface of the head 56 of bolt member 54 is in the form of a surface of revolution having the same axis as the stem of bolt member 54. The end surface of head 56 is flat and is provided with a slot by means of which bolt member 54 may be rotated. Screw threads are provided along a length of bolt member 54 at the end thereof opposite the head 56. The nut 60 is adapted to being threaded onto bolt member 54. Like the head 56, nut 60 is in the form of a surface of revolution having the same axis as the stem of bolt member 54. The top surface of nut 60 is flat and a slot is defined thereon by means of which it may be rotated upon bolt member 54. Near the outer end of beam member 46 there is defined an aperture to accommodate bolt member 54. The surface 58 defining the aperture is a surface of revolution. For a part of the distance through beam member 46, the surface 58 is cylindrical to accommodate the stem of bolt member 54. The remainder of this surface 58 is a surface of revolution which is designed to mate exactly with the head 56 of bolt member 54. Through beam member 44 there is defined an aperture like the one through beam member 46. A portion of the surface 62 defining this aperture is a surface of revolution adapted to mate exactly with the nut 60. The nut 60 and the head 56 are in such spaced relation that when the applied load is in the low range they are not seated against their respective mating surfaces, 62 and 58. The bolt member 54 does not aid in resisting the load. With a predetermined applied load, the deflection of the beam members 44 and 46 causes the nut 60 and the head 56 to become firmly seated against their respective mating surfaces, whereupon the bolt 54 is placed under tension and resists the applied load. It has been found in practice that mating surfaces in the forms of surfaces of revolution provide a smooth transition when the bolt member 54 becomes operative in resisting the applied load. By rotating the nut 60 on the threads of bolt member 54 the distance between the head and the nut can be selectively varied. It is therefore possible to select the point at which the maximum free deflection of the beam members 44 and 46 is arrested and at which the bolt member 54 begins resisting the load. An operator may select the predetermined value of applied load at which the bolt member 54 will begin resisting the load. Within design limitations, the maximum load of the low load range can be varied at will.

Although the embodiments of the invention described above are directed to the measurements of loads which are in tension with respect to the load indicator, it will be obvious to those versed in the art that by a simple rearrangement of certain of the elements of either of the embodiments shown in Figures 1 and 3, the invention can be adapted to loads applied in compression to the load indicator. The load indicator shown in Figure 1 can be adapted to the measurement of compressive loads by relocating the grooves 22 on the outer faces of the beam members 12, 14, and by relocating the groove 24 on the underside of beam member 12. Loads in compression could then be applied through cotters adapted to seat in the grooves 22. Cotter 28 would be fitted through a hole in the tie member 22 so located that the cotter 28 could be in proper spaced relation to the relocated groove 24. From the geometrical relations of the parts it is obvious that tie member 32, through the cotters 26, would resist compression loads above a predetermined load applied to the beam members 12 and 14 at the newly situated grooves 22. Referring now to Figure 3, the modified load indicator there shown can also be adapted to the measurement of compressive loads. The grooves 48 would be relocated to the outer faces of the beam members 44 and 46. A compression load can then be applied to the load indicator through cotters fitting in these grooves 48. The curved bearing surface portions of the surfaces 58 and 62 defining apertures in beam members 44 and 46 respectively, would each be situated on the opposite side of its respective beam member from the side shown in Figure 3. The head 56 and the nut 60 would be redesigned and relocated to seat in the relocated bearing surfaces in the confronting faces of beam members 44 and 46. The tie member 32 would then be able to resist loads applied in compression at the relocated grooves 48.

It will be obvious to those versed in the art that many modifications and other embodiments can be developed to produce two phases in a load versus strain curve by providing a member or members to resist an applied load up to a predetermined value of the applied load, and by providing restraining means to become operative in resisting the load after this predetermined load has been attained. By way of illustration and not by way of limitation, it may be noted that one means of accomplishing this would be to provide two restraining members in parallel adapted to become operative in resisting additional loads after a predetermined load has been applied.

It is obvious that it is within the scope of the present invention to produce more than two slopes or phases in a load versus strain curve. By way of illustration it may be noted that a third stage may be produced on the load versus strain curve by providing, in addition to a restraining means to become operative in resisting applied loads after a predetermined load is applied, a second restraining means arranged to become operative in resisting applied loads after a second predetermined load is attained. As an example, such a second restraining means might be similar in form to tie member 32, shown in Figure 1. It would be disposed in a manner similar to tie member 32, with similar associated cotters, hole, and grooves, and would be located nearer the cross-beam than tie member 32. Another illustrative example of means of producing more than two slopes or phases in the graph would be to provide two C-shaped members, one nested within the other. With transverse loads applied to the load indicator, one C-shaped member would bear the entire load up to a predetermined load, whereupon the outer portions of this member would impinge against the outer portions of the second C-shaped member. The second C-shaped member would then become operative in resisting the load in combination with the first C-shaped member.

While certain preferred embodiments of the invention have been specifically disclosed, it is understood that the invention is not limited thereto, as many variations will be readily apparent to those skilled in the art and the invention is to be given its broadest possible interpretation within the terms of the appended claims.

We claim:

1. A load measuring device comprising a pair of substantially rigid beam members having aligned rectangular apertures and being disposed in parallel relation, one above the other, the upper of said beam members having a transverse groove in its upper portion and the lower of said beam members having a transverse bore intersecting said aperture therein, a load carrying cross-beam integral with and disposed transversely between said beam members near the ends thereof, said cross-beam being adapted to undergo relatively large deformation upon the application thereto through said beam members of bending moments and tensile loads, means associated with said beam members and displaced from said cross-beam for enabling loads to be applied to each of said beam members to deflect said beam members apart, a tie member adapted to resist said loads, said tie member being disposed normal to said beam members and extending through said apertures therein, said tie member having a transverse bore near each end thereof, a cotter adapted to fit through one of said bores in said tie member and through said bore in said lower beam member, a second cotter adapted to fit through one of said bores in said tie member and adapted to seat in said groove in said upper beam member, said bores in said tie member, said groove in said upper beam member and said bore in said lower beam member being disposed in such spaced relations that beyond a predetermined deflection of said beam members said second cotter becomes seated in said groove whereupon said tie member resists said loads and the deflection of said beam members is restrained, whereby the deformation of said cross-beam per unit load applied to said beam members is reduced, and an electric strain gauge attached to the surface of said cross-beam to produce indications in accordance with the strains produced at said surface by bending moments and tensile loads applied to said cross-beam.

2. A load measuring device comprising a pair of substantially rigid beam members disposed one above the other in parallel relation, said beam members having a concave bearing surface in the upper portion of the upper of said beam members and a concave bearing surface in the lower portion of the lower of said beam members, said bearing surfaces being surfaces of revolution about the common axis of two bores, one of said bores extending from each bearing surface through its respective beam member, a load carrying cross-beam integral with and disposed between said beam members near the end thereof, said cross-beam being adapted to undergo deformation upon the application thereto through said beam members of a bending moment, means associated with said beam members and displaced from said cross-beam for enabling loads to be applied to said beam members to deflect said beam members apart, a bolt adapted to resist said loads and disposed through said bores in said beam members, the head of said bolt being in the form of a body of revolution adapted accurately to seat against one of said bearing surfaces, a nut in the form of a body of revolution adapted accurately to seat against one of said bearing surfaces, said nut being threadedly mounted on said bolt so that the distance between said head and said nut is selectively variable so that beyond a predetermined deflection of said beam members said head and said nut are seated against said bearing surfaces, whereupon said bolt resists said loads and the deflection of said beam members is restrained, whereby the deformation of said cross-beam per unit load applied to said beam members is reduced, and an electric strain gauge attached to the surface of said cross-beam to produce indications in accordance with the strains produced at said surface by bending moments and tensile loads applied to said cross-beam.

3. A load measuring device comprising a pair of substantially rigid beam members of rectangular cross-section, said beam members being disposed one above the other in parallel relation, means defining a concave bearing surface in the upper portion of the upper of said beam members, means defining a second concave bearing surface in the lower portion of the lower of said beam members, said bearing surfaces being surfaces of revolution about the common vertical axis of two bores, one of said bores extending from each bearing surface through its respective beam member, a load carrying cross-beam integral with and disposed transversely between said beam members near the ends thereof, said cross-beam being smaller in cross-section than said beam members and being adapted to undergo relatively large deformation upon the application thereto through said beam members of bending moment and tensile load, means associated with said beam members and displaced from said cross-beam for enabling a load to be applied normal to each of said beam members in such manner as to deflect said beam members apart, a bolt of circular cross-section adapted to resist said load, said bolt having a screw thread thereon and having a head in the form of a body of revolution adapted accurately to seat against one of said bearing surfaces, said bolt being disposed through said bores in said beam members, a nut in the form of a body of revolution adapted accurately to seat against one of said bearing surfaces, said nut being threadedly mounted on said bolt, the spaced relation between said head and said nut being selectively adjustable by means of said screw thread so that beyond a predetermined deflection of said beam members said head and said nut are seated against said bearing surfaces, whereupon said bolt resists the major portion of said load and the deflection of said beam members is restrained, whereby the deformation of the cross-beam per unit load applied to said beam members is reduced, and an electric strain gauge attached to the inner surface of said cross-beam to produce indications in accordance with the strains produced at said surface by bending moments and tensile loads applied to said cross-beam.

4. A load measuring device comprising a pair of substantially rigid beam members of rectangular cross-section, said beam members being disposed one above the other in parallel relation, means defining aligned rectangular apertures in said beam members, means defining a transverse groove in the upper portion of the upper of said beam members on either side of said aperture therein, means defining a transverse bore through the lower of said beam members and intersecting said aperture therein, a load carrying cross-beam integral with and disposed transversely between said beam members near the ends thereof, said cross-beam being smaller in cross-section than said beam members and being adapted to undergo relatively large deformation upon the application thereto through said beam members of bending moment and tensile load, means associated with said beam members and displaced from said cross-beam for enabling a load to be applied to each of said beam members in such manner as to deflect said beam members apart, said means including means defining aligned transverse grooves in the confronting portions of said beam members adapted to accommodate means for applying a load, a tie member of rectangular cross-section adapted to resist said load, said tie member being disposed normal to said beam members and extending through each of said apertures therein, said tie member having a transverse bore defined therethrough near each end thereof, a cotter adapted to fit through one of said bores through said tie member and adapted to fit through said bore in said lower beam members, a second cotter adapted to fit through one of said bores through said tie member and adapted to seat in said groove in said upper beam member, said bores in said tie member, said groove in said upper beam member and said bore in said lower beam member being disposed in such spaced relations that beyond a predetermined deflection of said beam members said second cotter becomes seated in said groove, whereupon said tie member resists the major portion of said load and the deflection of said beam members is restrained, whereby the deformation of the cross-beam per unit load applied to said beam members is reduced, and an electric strain gauge attached to the inner surface of said cross-beam to produce indications in accordance with the strains produced at said surface by bending moments and tensile loads applied to said cross-beam.

References Cited in the file of this patent

UNITED STATES PATENTS

| | | |
|---|---|---|
| 2,416,664 | Ruge | Feb. 25, 1947 |
| 2,419,061 | Emery | Apr. 15, 1947 |
| 2,421,222 | Schaevitz | May 27, 1947 |
| 2,582,886 | Ruge | Jan. 15, 1952 |
| 2,700,304 | Decker | Jan. 25, 1955 |